United States Patent [19]

Hutchin

[11] Patent Number: 4,582,427
[45] Date of Patent: Apr. 15, 1986

[54] TEST TARGET FOR ADAPTIVE OPTICS

[75] Inventor: Richard A. Hutchin, Marlboro, Mass.

[73] Assignee: The United States of America as represented by the Secretary of the Air Force, Washington, D.C.

[21] Appl. No.: 541,594

[22] Filed: Oct. 13, 1983

[51] Int. Cl.[4] ............................................. G01M 11/02
[52] U.S. Cl. ................................................. 356/124.5
[58] Field of Search ...................... 356/124, 124.5, 243; 351/243, 239; 250/237 G

[56] References Cited

U.S. PATENT DOCUMENTS

| | | |
|---|---|---|
| 1,802,052 | 3/1931 | Guernsey et al. |
| 1,933,305 | 10/1933 | Belt ................................ 88/14 |
| 3,413,066 | 11/1968 | Biber et al. ..................... 356/230 |
| 3,873,216 | 3/1975 | Gropper et al. .................. 356/243 |
| 4,241,996 | 12/1980 | Weiser ............................ 356/124.5 |
| 4,274,737 | 6/1981 | Howland ......................... 356/124.5 |
| 4,349,278 | 9/1982 | French et al. ................... 356/394 |

FOREIGN PATENT DOCUMENTS

| | | |
|---|---|---|
| 3013013 | 10/1981 | Fed. Rep. of Germany ...... 351/239 |
| 139764 | 1/1980 | German Democratic Rep. .................................. 356/124.5 |
| 439721 | 12/1935 | United Kingdom ............... 351/243 |

OTHER PUBLICATIONS

Murata, Progress in Optics, Wolf, vol. V, pp. 201-245, 1966.
Haehner, *Western Elect. Engr.*, vol. 15, No. 1, Jan. 1971, pp. 33-38.

*Primary Examiner*—F. L. Evans
*Attorney, Agent, or Firm*—Donald J. Singer; Jacob N. Erlich

[57] ABSTRACT

A test target for adaptive optics comprising, in the preferred embodiment, a plurality of nine adjacent, stacked, and aligned rows of a multiplicity of alternate opaque sections and transparent sections in a repeating bar pattern, with all sections being positioned on a flat transparent medium (such as film or glass), and with each opaque section being an opaque bar and with each transparent section being a transparent bar. Each row has a different spatial frequency than any other of the nine rows, with the spatial frequency of any one row being of a different multiple of the row having the lowest spatial frequency. As a matter of preference, the nine adjacent, stacked, and aligned rows are stacked with the first and lowermost row having the lowest spatial frequency, and with the ninth and uppermost row having the highest spatial frequency.

14 Claims, 4 Drawing Figures

TEST TARGET FOR ADAPTIVE OPTICS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to adaptive optics systems and more particularly to a unique test target for determining the limiting resolution of an adaptive optics system.

In adaptive optics, the resolution target must also be the reference source for the wavefront sensor. Thus, the target must be small (e.g., 1-10 arc seconds), and the grating patterns must give a uniform transmission on the average, so that the adaptive optics system being tested can "see" a uniform shape at the sensor. Another requirement is that the Modulation Transfer Function (hereinafter referred to as "MTF") of the adaptive optics system being tested can be quantitatively measured using the test target. A further requirement is that the target should be able to give a sensitive visual indication of the performance of the adaptive optics systems being tested.

It is fair and accurate to say that in the prior art there is no test target for adaptive optics which satisfactorily meets all of the above-described requirements.

SUMMARY OF THE INVENTION

The instant invention, unlike any prior art test target, satisfies all of the hereinbefore-mentioned requirements of a test target for adaptive optics. It, therefore, constitutes a significant advance in the state of the art.

In accordance with these requirements, the instant inventive adaptic optics test target is small (i.e. 1-10 arc seconds) and comprises a plurality (preferably nine) of adjacent, stacked, and aligned rows of a pattern (preferably in the configuration of bars) of alternate opaque sections and transparent sections which are positioned on a flat transparent medium (such as glass or film), with each row having a different spatial frequency than any other row, and with the spatial frequency of any one row being a different multiple of the row having the lowest spatial frequency.

It is here to be noted that, since the MTF is more meaningfully sampled at equal intervals in spatial frequency, the usual exponential spacing of prior art three-bar test targets is abandoned in the instant invention in favor of linear spacing.

It is here also to be noted that, since a tester would want more cycles at higher spatial frequencies, because modulation is lower and more cycles improve signal/-noise on the MTF measurement, the instant invention has grating patterns (i.e., bar patterns) placed so that the spatial frequencies vary monotically from low to high (or from high to low). This aids visual assessment of resolution.

It is here further to be noted that the instant invention incorporates discrete bands of different spatial frequencies, rather than continuously varying spatial frequency, because the spatial frequency being measured then is precisely defined, and is not dependent on the exact line in the image. The discrete bands also are very important for visual assessment of resolution.

Accordingly, it is an object of the instant invention to provide a test target which is small enough (e.g., 1-10 arc seconds) for use in adaptive optics.

It is another object of this invention to provide an adaptive optics test target having grating patterns which are in the configuration of bars, and which give uniform transmission on the average.

It is still another object of the instant invention to provide an adaptive optics test target by which the MTF can be more meaningfully sampled because of equal intervals in spatial frequency due to linear spacing used on the inventive test target.

It is yet another object of this invention to provide an adaptive optics test target on which the grating pattern (i.e., the bar patterns) are placed so that the spatial frequencies vary monotically from low to high (or, conversely, from high to low).

It is a further object of the instant invention to provide an adaptive optics test target which incorporates discrete bands of different spatial frequencies.

These objects of this invention, as well as other objects related thereto, will become readily apparent after a consideration of the description of the invention, together with reference to the figures of the drawing.

DESCRIPTION OF THE PREFERRED EMBODIMENT AND VARIATIONS THEREOF

Figure 1:
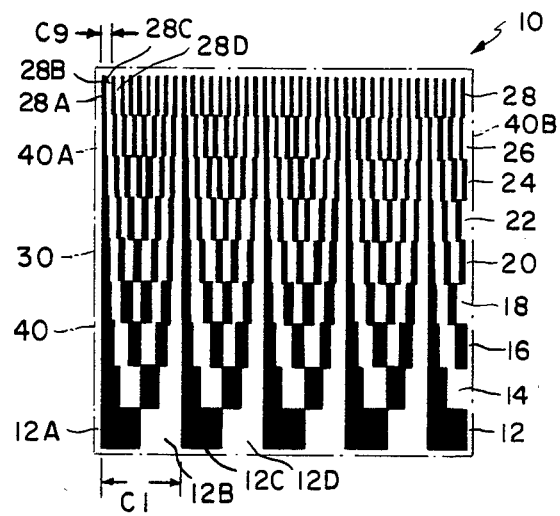
FIG. 1 is a front view, in simplified pictorial and schematic form, of the preferred embodiment of instant invention.

With reference to FIG. 1, therein is shown the preferred embodiment 10 of the instant invention, a test target for adaptive optics.

In the most basic and generic structural form, the preferred embodiment 10 comprises a plurality of adjacent rows (such as the nine rows designated 12, 14, 16, 18, 20, 22, 24, 26 and 28) of equal length, in a stacked (i.e., piled) relationship, of a pattern of a multiplicity of alternate opaque sections and transparent sections (such as, in representative row 12, representative opaque sections 12A and corresponding alternate transparent section 12B; and, in representative row 28, representative opaque section 28A and corresponding alternate transparent section 28B) which are positioned on a flat transparent medium (shown in phantom and designated 30), with each row having a different spatial frequency than any other row, and with the spatial frequency of any one row being a different multiple of the row having the lowest spatial frequency.

Still with reference to FIG. 1, and the preferred embodiment 10 shown therein, it is to be noted: that the pattern, of the multiplicity of alternate opaque sections and transparent sections in each row of the plurality of rows, is a repeating bar pattern, with each opaque section being an opaque bar and each transparent section being a transparent bar; that the plurality of rows is circumscribed by (i.e., is within) a quadrilateral (shown in phantom and designated 40) all of whose angles are right angles (e.g., a square or rectangle, with a square being shown in FIG. 1); that the plurality of rows extends from a side 40A of the square 40 to the corresponding parallel side 40B of square 40; and that the plurality of adjacent stacked rows are stacked in an aligned condition.

As a matter of preference and not of limitation, the plurality of adjacent, stacked, aligned rows of the preferred embodiment 10, FIG. 1, are stacked in order of increasing spatial frequency, with the first and lowermost row 12 having the lowest spatial frequency, and with the last and uppermost row 28 having the highest spatial frequency. More specifically, in the first and lowermost row 12, each cycle C1 includes one opaque bar and one transparent bar, so that the spatial frequency of row 12 is four and one-half cycles; whereas, in the last (i.e., ninth) and uppermost row, each cycle C9 includes one opaque bar and one transparent bar, so that the spatial frequency of ninth and last row 28 is forty and one-half cycles (or, nine times the four and one-half cycles in the first row 12). In this regard, an examination of the stacked and aligned rows will disclose: that the second row 14 has twice the spatial frequency of first row 12; that third row 16 has three times the spatial frequency of first row 12; that the fourth row 18 has four times the spatial frequency of first row 12; that fifth row 20 has five times the spatial frequency of the first row 12; that the sixth row 22 has six times the spatial frequency of the first row 12; that the seventh row 24 has seven times the frequency of the first row 12; and that the eighth row 26 has eight times the spatial frequency of the first row 12. Of course, the range of spatial frequencies should, and in this situation does, span the range of interest.

The nine stacked and aligned rows, or resolution bands, of the preferred embodiment 10, FIG. 1, can also be described specifically as follows: a first and lowermost row 12 having nine identically sized bars in the bar pattern, with five of the bars being opaque; a second row 14 having eighteen identically sized bars in the bar pattern, with nine of the bars being opaque, including the first bar in the row; a third row 16 having twenty-seven identically sized bars in the bar pattern, with fourteen of the bars being opaque; a fourth row 18 having thirty-six identically sized bars in the bar pattern, with eighteen of the bars being opaque, including the first bar in the row; a fifth row 20 having forty-five identically sized bars in the bar pattern, with twenty-three of the bars being opaque, including the first bar in the row; a sixth row 22 having fifty-four identically sized bars in the bar pattern, with twenty-seven of the bars being opaque, including the first bar in the row; a seventh row 24 having sixty-three identically sized bars in the bar pattern, with thirty-two of the bars being opaque; an eighth row 26 having seventy-two identically sized bars in the bar pattern, with thirty-six of the bars being opaque, including the first bar in the row; and, a ninth and uppermost row 28 having eighty-one identically sized bars in the bar pattern, with forty-one of the bars being opaque.

Figure 2:
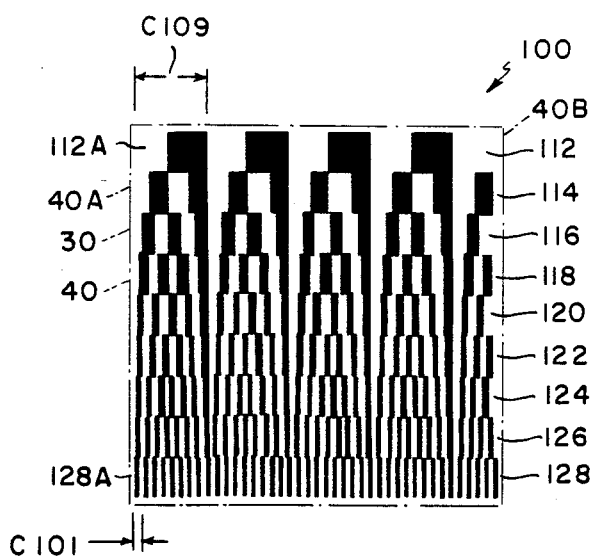
FIG. 2 is a front view, also in simplified pictorial and schematic form, of a variation of the preferred embodiment of the invention which is shown in FIG. 1.

Now, with reference to FIG. 2, therein is shown a variation 100 which, although it appears to be very similar to the preferred embodiment 10, FIG. 1, is in fact significantly different from the preferred embodiment 10 in two very material features. Firstly, the variation 100 is structured such that the plurality of adjacent, stacked, and aligned rows 128, 126, 124, 122, 120, 118, 116, 114 and 112 are stacked in order of decreasing (rather than increasing) spatial frequency, with the first and lowermost row 128 having the highest spatial frequency, and with the last (i.e., ninth) and uppermost row 112 having the lowest spatial frequency. Secondly, each row begins with a transparent bar (such as respresentative transparent bar 128A in representative row 128, and such as representative transparent bar 112A in representative row 112), whereas in the preferred embodiment 10, FIG. 1, each row begings with an opaque bar. The other features of this test target 100 are similar to those of the preferred embodiment 10, FIG. 1, and therefore need not be repeated here.

Figure 3:
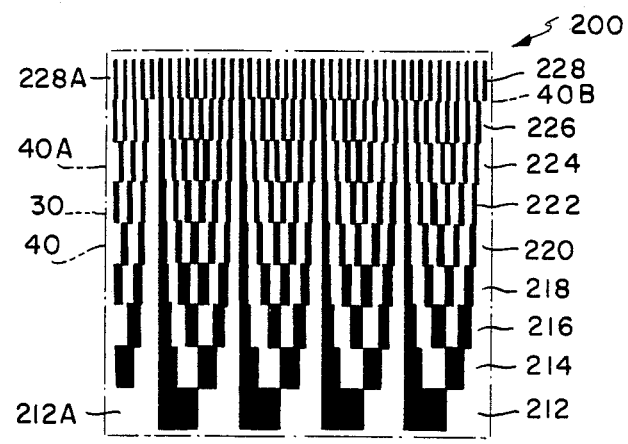
FIG. 3 is a front view, also in simplified pictorial and schematic form, of another variation of the preferred embodiment.

With reference to FIG. 3, therein is shown another significant variation 200. This variation 200 incorporates some of the features of the preferred embodiment 10, FIG. 1, and some of the features of the variation 100, FIG. 3. More specifically, similar to the preferred embodiment 10, FIG. 1, the variation 200 is structured such that the plurality of adjacent, stacked, aligned rows 212, 214, 216, 218, 220, 222, 224, 226 and 228 are stacked in order of increasing spatial frequency, with the first and lowermost row 212 having the lowest spatial frequency, and with the highest (i.e., ninth) and uppermost row 228 having the highest spatial frequency. In addition, similar to the variation 100, FIG. 2, each row begins with a transparent bar, such as representative transparent bar 212A in representative row 212, and such as representative transparent bar 228A in representative row 228. Other features of this variation 200 are easily ascertainable from the contents of FIG. 3, and have been described hereinbefore, so that further structural decription of this variation 200 is not necessary.

Figure 4:
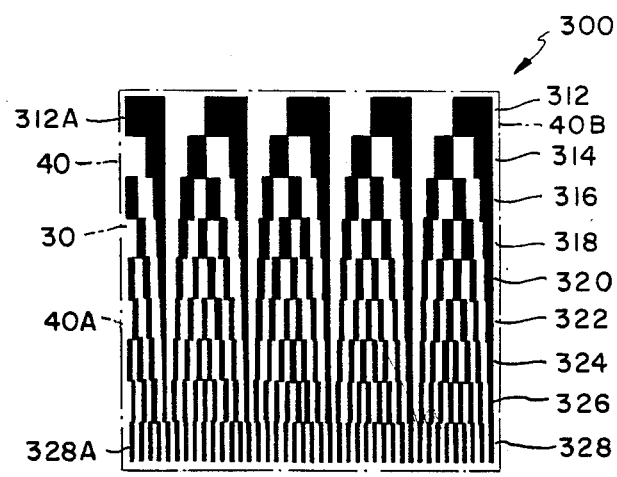
FIG. 4 is a front view, also in simplified pictorial and schematic form, of still another variation of the preferred embodiment.

Now, with reference to FIG. 4, therein is shown still another significant variation 300. This variation 300 incorporates some of the features of the preferred embodiment 10, FIG. 1, and some of the features of the variation 100, FIG. 3. More specifically, similar to variation 100, FIG. 2, the variation 300 is structured such that the plurality of adjacent, stacked, and aligned rows 328, 326, 324, 322, 320, 318, 316, 314 and 312 are stacked in order of decreasing spatial frequency, with the first and lowermost row 328 having the highest frequency, and with the last (i.e., ninth) and uppermost row 312 having the lowest spatial frequency. In addition, similar to the preferred embodiment 10, FIG. 1, each row begins with an opaque bar, such as representative opaque bar 328A in representative row 328, and such as representative opaque bar 312A in representative row 312. The other pertinent structural features of this variation 300 are readily ascertainable from the contents of FIG. 4, and already have been described, such that further structural description of this variation 300 is not necessary.

It is to be noted that the constituent alternate opaque and transparent bars of inventive adaptive optics test targets 10, 100, 200 and 300 are positioned on (i.e., supported by) the flat transparent medium 30 which can be flat transparent film, or flat transparent glass, or the like.

It is also to be noted that, just as is the situation with regard to preferred embodiment 10, the inventive adaptic optics test targets 100, 200 and 300 are circumscribed by (i.e., are within) a quadrilateral 40 all of whose angles are right angles, such as a square or a rectangle, with a square being preferred.

MANNER AND USE OF THE PREFERRED EMBODIMENT AND VARIATIONS

The manner of use, and of operation, of the preferred embodiment 10, FIG. 1, and of the variations thereof 100, FIG. 2, 200, FIG. 3, and 300, FIG. 4, of the instant invention can be easily ascertained by any person of ordinary skill in the art from the foregoing description, coupled with reference to the contents of the figures of the drawings.

For those not of the art, the following informative comments are made:

When any one of the inventive test targets 10, 100, 200 and 300 is used in an adaptive optic system, the size of that test target is set to the size of the target which is to be acquired by the adaptive optic system. That size can, for example, be 1–10 arc seconds (i.e., 1/3600 to 10/3600 of a degree), which is the size of the angle subtended ("viewed") by the system. Then, light is transmitted through the test target which is positioned on (i.e., supported by) the flat transparent medium 30, such as a flat glass plate. Next, the test target is used by the adaptive optic system for tracking and system correction, just as with a usual target. The corrected test target image appearing at the camera of the system can be visually examined, while the system parameters are varied to optimize performance. The visual resolution seen in the test target image is an excellent indicator of overall system performance. In this regard, it is to be noted that, by measuring the modulation along any row, the Modulation Transfer Function of the spatial system can be accurately measured. Using, for illustrative purposes, the test target 10, FIG. 1, the contrast typically will get less and less between the second row 14 to the ninth row 28, and will become visually zero somewhere in between. The last row which is visible will give a good estimate of the limiting resolution of the adaptive optic system.

As an alternative to the above-mentioned visual examination of the test target image, each row of the test target image can be scanned electronically to measure the modulation at each spatial frequency. This modulation gives a quick and accurate measurement of the adaptive optic system performance over a wide range of spatial frequencies. In this regard, it is to be noted that when the modulation is measured with and without adaptive optic correction, the ratio obtained thereby represents the improvement factor due to adaptive optics.

CONCLUSION

It is abundantly clear from all of the foregoing, and from the contents of the Figures of the drawing, that the stated objects of the instant invention, as well as other objects related thereto, have been achieved.

It is to be noted that, although there have been described and shown the fundamental and unique features of the instant invention as applied to a preferred embodiment 10, FIG. 1, and to three variations thereof (100, FIG. 2; 200, FIG. 3; and 300, FIG. 4), nevertheless various other embodiments, variations, adaptations, substitutions, additions, omissions, and the like may occur to and can be made by those of ordinary skill in the art. For example, when the inventive test target 10, 100, 200 or 300 is used, it need not be in the orientation shown, respectively, in FIGS. 1, 2, 3 or 4. The selected inventive test target can be rotated in any direction, and to any extent, necessary or desired for the particular use intended, e.g., ninety degrees, and thereby be oriented diamond-like.

What is claimed is:

1. A test target for adaptive optics, comprising: a plurality of adjacent rows of equal length, in a stacked relationship, of a pattern of a multiplicity of alternate opaque sections and transparent sections which are positioned on a flat transparent medium; each of said rows having a different spatial frequency than any other row; the spatial frequency of any one of said rows being a different integral multiple of the row having the lowest spatial frequency; and said pattern, of said multiplicity of alternate opaque sections and transparent sections in each row of said plurality of rows, being a repeating bar pattern, with each of said opaque sections being an opaque bar and with each of said transparent sections being a transparent bar.

2. A test target for adaptive optics, as set forth in claim 1, wherein each of said opaque and said transparent bars is in the shape of a quadrilateral.

3. A test target for adaptive optics, as set forth in claim 2, wherein each of said quadrilateral-shaped bars is in the shape of a rectangle.

4. A test target for adaptive optics, as set forth in claim 1, wherein said plurality of adjacent stacked rows are stacked in an aligned condition.

5. A test target for adaptive optics, as set forth in claim 4, wherein said plurality of adjacent, stacked, and aligned rows are stacked in order of increasing spatial frequency, with the first and lowermost row having the lowest spatial frequency, and with the last and uppermost row having the highest spatial frequency.

6. A test target for adaptive optics, as set forth in claim 5, wherein said plurality of adjacent, stacked, and aligned rows are nine in number.

7. A test target for adaptive optics, as set forth in claim 6, wherein:
   a. said first and lowermost row has nine identically sized bars in said bar pattern, with five of said bars being opaque;
   b. said second row has eighteen identically sized bars in said bar pattern, with nine of said bars being opaque, including the first bar in said row;
   c. said third row has twenty-seven identically sized bars in said bar pattern, with fourteen of said bars being opaque;
   d. said fourth row has thirty-six identically sized bars in said bar pattern, with eighteen of said bars being opaque, including the first bar in said row;
   e. said fifth row has forty-five identically sized bars in said bar pattern, with twenty-three of said bars being opaque;
   f. said sixth row has fifty-four identically sized bars in said bar pattern, with twenty-seven of said bars being opaque, including the first bar in said row;
   g. said seventh row has sixty-three identically sized bars in said bar pattern, with thirty-two of said bars being opaque;
   h. said eighth row has seventy-two identically sized bars in said bar pattern, with thirty-six of said bars being opaque, including the first bar in said row; and
   i. said ninth and uppermost row has eighty-one identically sized bars in said bar pattern, with forty-one of said bars being opaque.

8. A test target for adaptive optics, as set forth in claim 4, wherein said flat transparent medium is flat transparent film.

9. A test target for adaptive optics, as set forth in claim 7, wherein said flat transparent medium is flat transparent glass.

10. test target for adaptive optics, as set forth in claim 6, wherein:
   a. said first and lowermost row has nine identically sized bars in said bar pattern, with five of said bars being transparent;
   b. said second row has eighteen identically sized bars in said bar pattern, with nine of said bars being transparent, including the first bar in said row;
   c. said third row has twenty-seven identically sized bars in said bar pattern, with thirteen of said bars being transparent;
   d. said fourth row has thirty-six identically sized bars in said bar pattern, with eighteen of said bars being transparent, including the first bar in said row;
   e. said fifth row has forty-five identically sized bars in said bar pattern, with twenty-three of said bars being transparent;
   f. said sixth row has forty-four identically sized bars in each bar pattern, with twenty-seven of said bars being transparent, including the first bar in said row;
   g. said seventh row has sixty-three identically sized bars in each bar pattern, with thirty-two of said bars being transparent;
   h. said eighth row has seventy-two identically sized bars in each bar pattern, with thirty-six of said bars being transparent, including the first bar in said row; and
   i. said ninth and uppermost row has eighty-one identically sized bars in each bar pattern, with forty-one of said bars being transparent.

11. A test target for adaptive optics, as set forth in claim 4, wherein said plurality of adjacent, stacked, and aligned rows are stacked in order of decreasing spatial frequency, with the first and lowermost row having the highest spatial frequency, and with the last and uppermost row having the lowest spatial frequency.

12. A test target for adaptive optics, as set forth in claim 11, wherein said plurality of adjacent, stacked, and aligned rows are nine in number.

13. A test target for adaptive optics, as set forth in claim 12, wherein:
   a. said first and lowermost row has eighty-one identically sized bars in said bar pattern, with forty-one of said bars being transparent;
   b. said second row has seventy-two identically sized bars in said bar pattern, with thirty-six of said bars being transparent, including the first bar is said row;
   c. said thir row has sixty-three identically sized bars in said bar pattern, with thirty-two of aid bars being transparent;
   d. said fourth row has fifty-four identically sized bars in said bar pattern, with twenty-seven of said bars being transparent, including the first bar in said row;
   e. said fifth row has forty-five identically sized bars in said bar pattern, with twenty-three of said bars being transparent;
   f. said sixth row has thirty-six identically sized bars in said bar pattern, with eighteen of said bars being transparent, including the first bar in said row;
   g. said seventh row has twenty-seven identically sized bars in said bar pattern, with fourteen of said bars being transparent;
   h. said eighth row has eighteen identically sized bars in said bar pattern, with nine of said bars being transparent, including the first bar in said row; and
   i. said ninth and uppermost row has nine identically sized bars in said bar pattern, with five of said bars being transparent.

14. A test target for adaptive optics, as set forth in claim 12, wherein:
   a. said first and lowermost row has eighty-one identically sized bars in said bar pattern, with forty-one of said bars being opaque;
   b. said second row has seventy-two identically sized bars in said bar pattern, with thirty-six of said bars being opaque, including the first bar in said row;
   c. said third row has sixty-three identically sized bars in said bar pattern, with thirty-two of said bars being opaque;
   d. said fourth tow has fifty-four identically sized bars in said bar pattern, with twenty-seven of said bars being opaque, including the first bar in said row;
   e. said firth row has forty-five identical sized bars in said bar pattern, with twenty-three of said bars being opaque;
   f. said sixth row has thirty-six identically sized bars in said bar pattern, with eighteen of said bars being opaque, including the first bar in said row;
   g. said seventh row has twenty-seven identically sized bars in said bar pattern, with fourteen of said bars being opaque;
   h. said eighth row has eighteen identically sized bars in said bar pattern, with nine of said bars being opaque, including the first bar in said row; and
   i. said ninth and uppermost row has nine identically sized bars in said bar pattern, with five of said bars being opaque.

* * * * *